United States Patent [19]

Hertlein et al.

[11] Patent Number: 4,976,408
[45] Date of Patent: Dec. 11, 1990

[54] DEVICE FOR MICROFILMING BOUND VOLUMES USING A TILTABLE BOOK CRADLE

[75] Inventors: Ernst Hertlein; Anselm Herrmann, both of Garmisch-Partenkirchen, Fed. Rep. of Germany

[73] Assignee: Herrmann & Kraemer GmbH & Co. K.G., Garmisch-Partenkirchen, Fed. Rep. of Germany

[21] Appl. No.: 357,277

[22] Filed: May 26, 1989

[30] Foreign Application Priority Data

Jun. 9, 1988 [DE] Fed. Rep. of Germany ....... 3819576

[51] Int. Cl.$^5$ ............................................. G03G 15/00
[52] U.S. Cl. .................................. 248/446; 248/454; 248/139
[58] Field of Search ...................... 248/446, 441.1, 447, 248/139, 451, 453, 454, 458, 671

[56] References Cited

U.S. PATENT DOCUMENTS

| | | |
|---|---|---|
| 1,175,221 | 3/1916 | Beidler . |
| 1,254,195 | 1/1918 | Beidler ............................. 248/446 |
| 2,198,356 | 4/1940 | Unger et al. ...................... 248/446 |
| 2,418,670 | 4/1947 | Schubert et al. .................. 248/446 |
| 3,053,007 | 9/1962 | Goodwin ....................... 248/446 X |
| 4,655,478 | 4/1987 | Malyon ...................... 248/441.1 X |
| 4,781,355 | 11/1988 | Jeantin ............................ 248/441.1 |
| 4,782,370 | 11/1988 | Sudou ............................... 248/447 |

FOREIGN PATENT DOCUMENTS 0149897 7/1985 European Pat. Off. .
512455 9/1939 United Kingdom ............... 248/446

Primary Examiner—Alvin C. Chin-Shue
Attorney, Agent, or Firm—Penrose Lucas Albright

[57] ABSTRACT

Many problems are encountered in photographing or photocopying bound books using current techniques. This is especially true during microfilming old and valuable books. These problems arise partially from the requirement to avoid straining the book to be photographed, especially the spine of the book, and partially from the manner in which the inner page portions are distorted when presented for photographing. A microfilm device of simple construction, which is also simple to operate, to overcome these problems, has a book cradle which can be tilted through at least a 90° arc. The support walls of the book cradle stand perpendicular to one another to support the book cover thereby defining two sides of a work space. The book cradle rests on a traverse guide which can be raised and lowered such that the top surface of one support wall, or the top page of a stack of book pages, can be pressed against the bottom surface of a glass plate which can be moved horizontally into the work space, the resting position of the horizontal glass plate being centered on the focal axis of the microfilm camera.

18 Claims, 2 Drawing Sheets

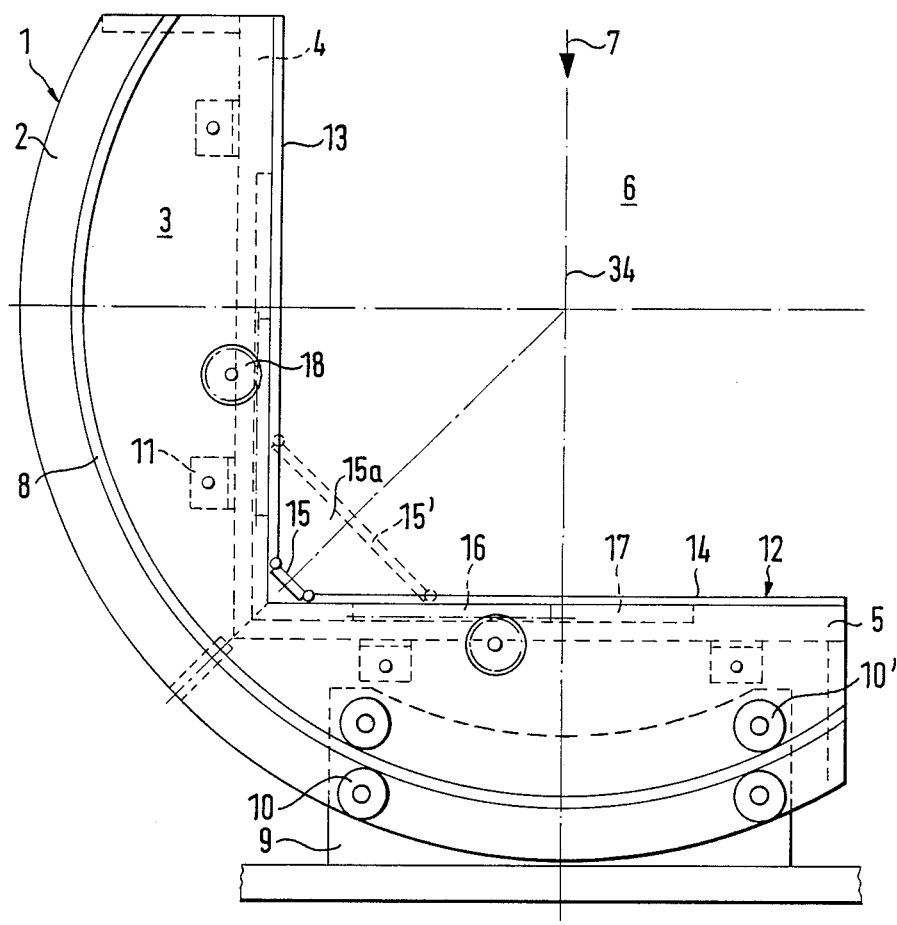

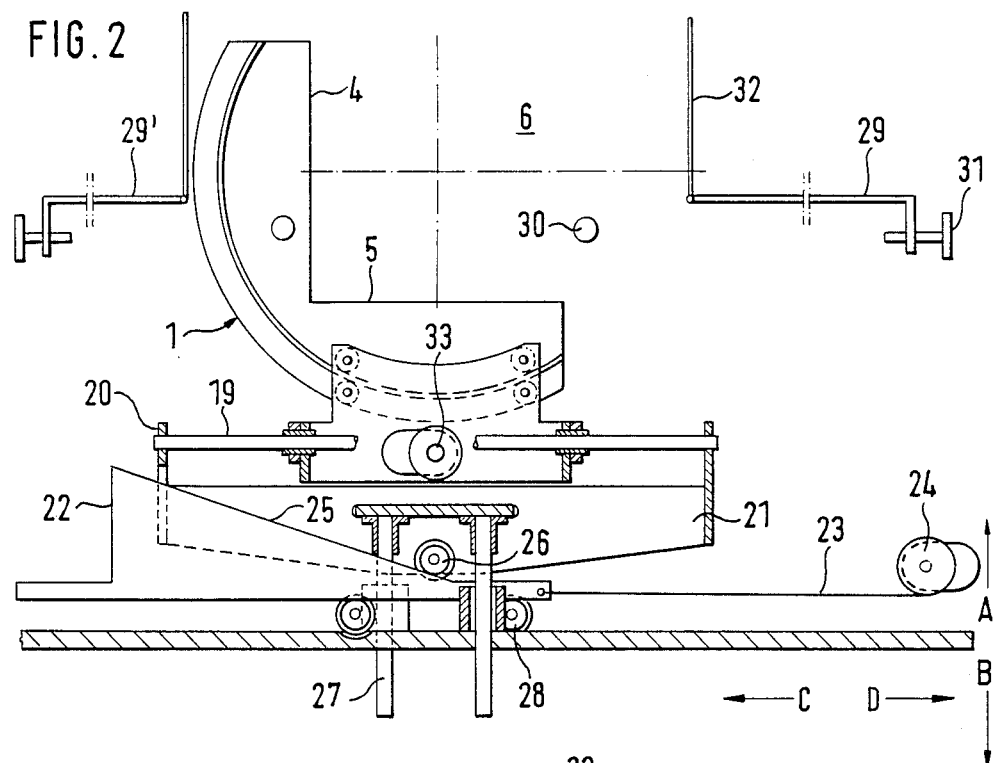
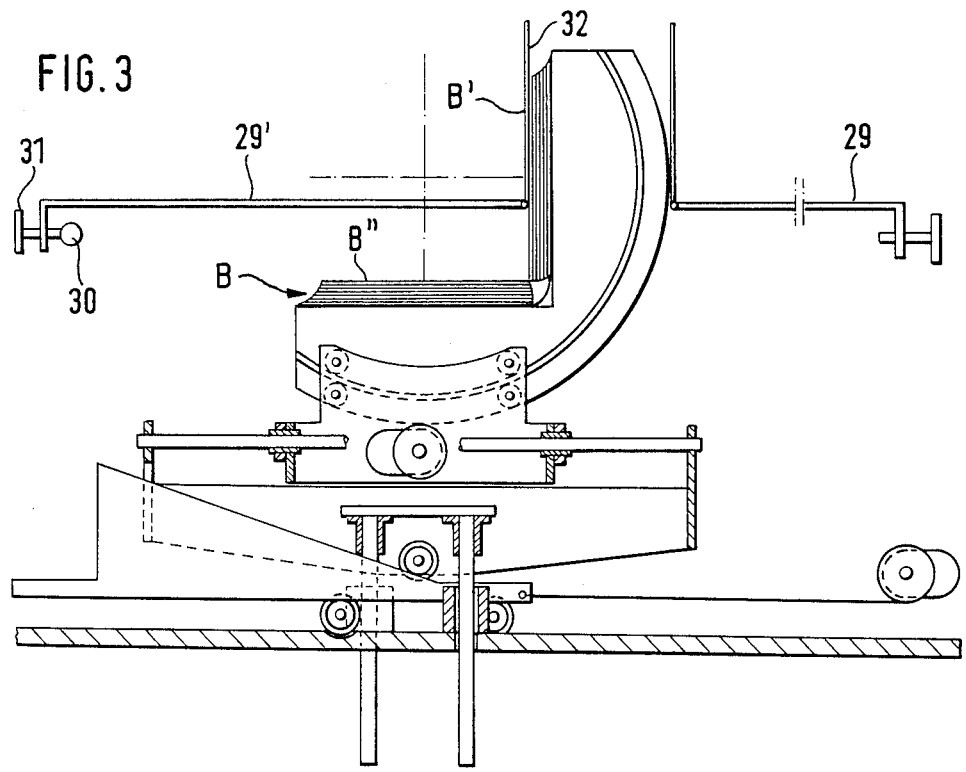

DEVICE FOR MICROFILMING BOUND VOLUMES USING A TILTABLE BOOK CRADLE

BACKGROUND OF THE INVENTION

The invention relates to a device for microfilming bound volumes. The term "volumes" is to be construed in its broadest sense so as to include not only printed works, in the form of texts, but also any works of illustrative and photographic representations, drawings, plans, tables, formulas and the like.

In addition to facilitating the production of reprints or facsimiles, another very important use for the device is for microfilming bound volumes having unique or special characteristics. There exists an ever-increasing need for such microfilming. It is especially important for the microfilming of old and valuable books, as many of them, because of paper quality, are disintegrating over time even when they are protected and carefully maintained. Indeed, in many cases, the disintegration can be prevented or, at least, considerably slowed by modern preservation procedures. However, the number of such valuable books is so great that it is quite impossible to preserve all of them in a proper manner. Thus, to retain, at least, the content and appearance, as well as the composition, of these works for future generations, a process of archiving on microfilm has been attempted and has proven successful. The microfilming serves not only the function of archiving, but also makes the contents of such valuable books available and accessible to scientists, students, teachers and other interested persons.

The current methods and devices for microfilming bound volumes, especially old books, are less than satisfactory for several reasons. One reason, which is addressed in this specification, is the difficulty of making reproductions true to the original to a very high standard.

The simplest method of microfilming is to photograph two adjacent pages simultaneously as the book is spread open against a glass plate. However, in many cases this is not possible. As one knows from photocopying an open book spread against a glass plate, a lip-like bead is formed over the spine and it is difficult to photograph the inside area sharply, clearly and without distortion. This is especially true at the ends of the lines of the opposing pages where they come together at the binding. This problem with distortion increases proportionally as one stack of pages becomes smaller and the other stack of pages becomes larger. For instance, when one is copying from a book of 500 pages and pages 10 and 11 are to be photographed simultaneously, the arrangement beneath the projection plane is such that one stack of pages includes the book cover and five pages and the other stack of pages, to the opposite side of the middle line of the spread-open book, contains 245 pages and the other book cover. A horizontal plane of photography can thus be attained only if the pages of the book supported beneath the horizontal plane, in the stack of lower height, as compared with the stack of greater height, are specially supported. This support requires a height compensation mechanism that can be continually adjusted. Such a mechanism is involved and complicated.

The aforementioned difficulty increases considerably in the case of many of the old and therefore valuable books. In earlier times, for economic reasons, as much width as possible of each page was used. The written text and displayed images extended as far as possible toward the edges of the pages. That means, in old books, where the adjacent pages are abutted at their inside edges, reproduction free of distortion has been impossible. What is true with new volumes, which have no text and no image representation in that area, has been a quite impossible situation with old books, as both text and illustrations to be photographed are located where they can't be reached.

A further difficulty in microfilming, in accordance with the current art, arises in that the back of the book, its spine, is greatly stressed during the process and sometimes overstressed. With old books, especially, this stress often cannot be withstood. In such cases, to preclude damage, one is forced to photograph the book page by page, that is, one page at a time. To do so, the book is positioned opened with the stacks of pages disposed at a right angle to one another. The stack of pages lying horizontal is guided beneath a glass plate, while the vertical stack of pages must be held manually. When the vertical stack of pages comprises a voluminous folio, it is a physically difficult job. Also, this arrangement requires that the microfilm be rotated 180° for each second page which greatly degrades the microfilm readability.

A copy-holder for bound volumes to be microfilmed is disclosed in U.S. Pat. No. 1,175,221. The copy-holder consists of two support plates fixedly arranged perpendicular to one another, which limits the work space to two sides. The book to be photographed is placed into the work space. Although the two support plates have a hinge attaching them to the frame, the copy-holder can be tilted only within a very limited range. As shown in FIG. 1 of the U.S. Pat., stop boards or some sort of stop mechanisms are provided on the frame to prevent tipping of the copy-holder more than approximately 45°.

European Pat. No. 0 149 897 A2 discloses a photocopier with a book support. The book support rests on a traverse guide which can be raised and lowered to be pressed against the bottom surface of a glass plate found in the work space. The book support consists of two plates which are perpendicular or almost perpendicular to each other and is rotatable around a vertical axis so that, after the top page of the stack of pages on the side of the book engaging the plate have been photographed, the support is rotated 180° and the top page of the opposite stack of pages can be photographed. This rotation of each second photocopied page reverses photographed opposite pages by 180°, which makes the resulting microfilm products practically unusable.

SUMMARY OF THE INVENTION

Thus, the object of the invention is to provide a device for photographing bound volumes, especially books which are particularly delicate to handle, that allows for uncomplicated photography of each page in turn, without stress to the book and especially to the spine of the book, such that even the area of each page adjacent to the binding is photographed and the pages are reproduced satisfactorily and without distortion.

The invention is described hereinafter with reference to the drawings.

DETAILED DESCRIPTION OF THE DRAWINGS

FIG. 1 is side view of the book cradle.

FIG. 2 is a side view of the book cradle and positioning mechanism prior to commencing photography; and FIG. 3 is a side view with the device ready for photography and the book cradle in the opposite work position.

DESCRIPTION OF THE PREFERRED EMBODIMENTS

In FIG. 1, a book cradle is indicated in its entirety by reference numeral 1. Book cradle 1 comprises two tire pieces 2 spaced at some distance from one another, end walls 3 attached to each tire piece and support walls 4 and 5 connecting the two spaced-apart tire pieces 2 and wall structures 3. Support walls 4 and 5 lie at a right angle to one another and on two sides define a work space 6, above which is arranged a camera, indicated solely by an arrow 7, aimed along focal axis 34.

Each piece of tire has a flange 8 which supports and holds book cradle 1 between slightly tilted pairs of rollers 10, 10' mounted in base plates or bearing plates 9. This mounting permits book cradle 1 to be easily tilted by motor power, or other means, into the position show in FIG. 2 or that shown in FIG. 3 wherein support wall 5 is upright and support wall 4 is horizontal. Support walls 4 and 5 are attached by screws, or by other known means, to end walls 3 by couplings 11. Book support 12 can be provided for holding a book against the outside surfaces of support walls 4 and 5 and retaining the pages standing at a right angle to one another. Book support 12 comprises cover plates 13 and 14 and book spine plate 15. Cover plates 13 and 14 are attached to spine plate 15 by hinge joints. The hinge joints are arranged and configured such that spine plate 15 can be easily exchanged to adapt book support 12 for books having spines of differing thicknesses. This adaptability is shown in FIG. 1 wherein spine plate 15', indicated by dashed lines, is broader than spine plate 15.

Cover plates 13 and 14 each have a toothed rack member 16 mounted on the side opposite work space 6. Toothed rack member 16 is most advantageously mounted along a plane perpendicular to cover plates 13 and 14 and midway between end plates 3. Toothed rack member 16 can be seated in a slot or a groove 17 of support wall 4 or, respectively, 5 and there mates with a cogwheel (not shown), which is operated by crank 18. Thus, with a book placed in book support 12 and opened at a right angle, it is possible that cover plates 13,14 may be adjusted relative to support walls 4,5, respectively, to provide different inclinations of spine plate 15, to accommodate the changing thicknesses of stacks of pages by producing a variable inclination of the book spine as photographing progresses.

If book support 12 is not used, or for strongly diverging non-standard forms or shapes of material being photographed, wedges can be used. For instance, wood or plastic wedges of various sizes, adapted to space 15a to the rear of the spine of the book, can be placed therein with an appropriate inclination of the wedge surface turned toward the book spine.

As illustrated in FIG. 2, book cradle 1 is mounted so as to be tiltable and horizontally slidable on rods 19. Rods 19 are mounted in side walls 20 of traverse guide 21.

Traverse guide 21 can be raised or lowered as indicated by arrows A and B respectively. Tension wedge 22 is provided for raising or lowering traverse guide 21. Tension wedge 22 is moved in the direction indicated by arrow D by means of tension cable 23 attached to motor-powered cable wheel 24. Wheel 26, mounted on traverse guide 21, rolls along wedge surface 25, raising traverse guide 21 when tension wedge 22 is pulled in direction D. Traverse guide 21 is lowered when tension wedge 21 moves in the direction of arrow C, for instance, when motor-powered cable wheel 24 is reversed, creating slack in tension cable line 23 and allowing the slack to be taken up by a return spring (not shown) or other means known in the art. Members 27 are guide bars sliding in bushings 28. Members 27 ensure the vertical movement of traverse guide 21 and preventing any tilting thereof. In lieu of the tension wedge 22, vertical movement of traverse guide 21 can also be provided in some other manner, such as hydraulically or pneumatically.

In addition to book cradle 1 and its positioning mechanism, two glass plates 29,29' are parts of the device. They are shown diagrammatically in FIGS. 2 and 3, and may be supported in any appropriate manner such that they are movable in the directions of arrows C and D. Page B" of book B to be photographed is moved, in book cradle 1, so as to be positioned against the bottom of one of the plates 29,29'. Sufficient pressure is applied to level page B". Fixed stop gauges 30,30' and adjustable stop screws or gauges 31,31' allow accurate positioning of glass plates 29,29'. Holding blades 32, spring or resiliently mounted at the ends of glass plates 29,29', prevent pages from perpendicularly upright page stack B' from falling into work space 6. A motor with drive 33 is used to tilt book cradle 1.

The device operates as follows:

First, one of the two glass plates, for instance, glass plate 29' as shown in FIG. 3, is centered relative to focal axis 34 of camera 7. The centering is achieved by means of stop board 30' and stop gauge 31', stop gauge 31' being adjusted to correspond to the breadth of the book which is being photographed or to the page from a stack of pages B" to be photographed. Then, in the same manner, with tiltable book cradle 1 in the position shown in FIG. 2, glass plate 29 is centered with the other stack. No further adjustment of either stop gauge 31,31' is required to place the respective glass plates 29,29' in a suitable position for photographing the pages from the volume.

When the free glass plate, for instance, glass plate 29 of FIG. 2, is in the proper position to be photographed, book cradle 1 is moved, by known means, in the direction of glass plate 29 (arrow D), by sliding on rods 19, until the inside edge of glass plate 29 and holding blade 32 together loosely engage the top of the perpendicular stack of pages. This evolution is accomplished by means of a motor that powers, for example, an endless cog belt which causes glass plates 29, 29' to move in opposite directions or by other means known in the art. Once the edge of glass plate 29 loosely engages the vertical stack of pages, traverse guide 21 is raised, carrying book cradle 1, by means of tension wedge 22 and tension cable line 23, until it reaches the point where the page to be photographed is in contact with the bottom surface of glass plate 29 and the page is photographed. Then, after traverse guide 21 is lowered once again and as glass plates 29,29' move in the direction of arrow D, book cradle 1 is swiveled into its opposite position (FIG. 3), and the procedure is repeated with the other glass plate 29'. Differences in the thickness of the perpendicular stacks of pages are compensated for by a highly sensitive slip clutch.

After photographing both pages, and prior to reinitiation of the sequence by raising the book cradle 1 so that the page abuts the bottom of glass plate 29, the page of the book is turned manually. Thus, in this manner, the relevant glass plate can always be positioned over the entire page of a book, including the inside edge, without placing strain on the book's sensitive spine. Also, with this manner of holding the book, all of the pages of the book are identically oriented when photographed. In other words, they will all be readable from one direction on film, that is, the film will not have to be rotated to read alternating pages.

The invention is not limited to the features described in the foregoing and claimed in the claims, but also comprises any combination of features as described in the description and as illustrated in the drawings.

Having disclosed our invention, what we claim as new and to be secured by Letters Patent of the United States is:

1. A device for photographing bound volumes comprising:
   a support comprising two support walls standing perpendicular to one another for supporting a book cover and delimiting a work space on two sides;
   at least one horizontal glass plate and means for moving same operably associated therewith for sliding said plate glass into and out of said work space; said support including an arcuate cradle that is constructed and arranged to be rotatable through an arc at least 90° and so that said glass plate can be slid into and out of said work space by said means for moving; and transverse guide means for pressing a page to be photographed against the bottom surface of said glass plate, said cradle being rotatable relative to said guide means.

2. A device as claimed in claim 1, wherein said support including said cradle comprises: two tire pieces spaced apart from one another, each said tire piece subtending an arc of approximately 150°; and two end pieces, said end pieces joining said two support walls standing perpendicular to one another and said two tire pieces comprising means for rotating said cradle.

3. A device as claimed in claim 2, wherein each said tire piece has a flange and said traverse guide has mounted thereon a plurality of paired rollers, each said flange being held between at least two sets of paired rollers to support said cradle.

4. A device as claimed in claim 3, wherein said cradle is mounted to be horizontally stable.

5. A device as claimed in claim 4, further comprised of two base plates and two horizontal rods, said horizontal rods being mounted at the ends of said traverse guide means, said base plates slidably mounted on said horizontal rods wherein at least one pair of said paired rollers are attached to each said base plate.

6. A device as claimed in claim 1, wherein said support comprises a cover plate for engaging each of said support walls and a modifiable spine plate connected to said cover plates by hinge joints.

7. A device as claimed in claim 6, wherein a toothed rack member is mounted on each of said cover plates where it can be slidable in a slot or a groove of the engaged said support wall, said toothed rack member mating in said slot or groove with a cogwheel, said cogwheel capable of being rotated by means of a crank.

8. A device as claimed in claim 1, further comprising a tension wedge means for raising and lowering said traverse guide means;
   a drive means for moving said tension wedge means horizontally; and
   at least one wheel mounted on said traverse guide such that said wheel rolls on the upper surface of said tension wedge means.

9. A device as claimed in claim 1, further comprising a holding blade arranged to stand substantially perpendicular to said glass plate, said holding blade mounted on the inside edge of said glass plates.

10. A device as claimed in claim 8, wherein said drive means for said tension wedge means comprises a tension cable line.

11. A device for photographing bound volumes comprising: a book cradle having two support walls standing perpendicular to one another for supporting a book cover and delimiting a work space on two sides, said book cradle being capable of being tilted through an arc of at least ninety degrees; said book cradle comprising two tire pieces spaced apart from one another, each said tire piece subtending an arc of approximately one hundred fifty degrees, two end pieces, said end pieces joining said two support walls standing perpendicular to one another and said two tire pieces to enclose said cradle, each of said tire piece having a flange; a traverse guide supporting said book cradle, said traverse guide capable of being raised and lowered, said traverse guide having mounted thereon a plurality of paired rollers, each said flange being held between at least two sets of said paired rollers to support said book cradle; and at least one horizontal glass plate which can be slid into said work space wherein a top surface of one of said support walls of said book cradle can be pressed against the bottom surface of said horizontal glass plate.

12. A device as claimed in claim 11, wherein said book cradle is mounted to be horizontally stable.

13. A device as claimed in claim 12, further comprising two base plates and two horizontal rods, said horizontal rods being mounted at the ends of said traverse guide, said base plates slidably mounted on said horizontal rods wherein at least one pair of said paired rollers are attached to each said base plate.

14. A device for photographing bound volumes comprising: a book cradle having two support walls standing perpendicular to one another for supporting a book cover and delimiting a work space on two sides, said book cradle being capable of being tilted through a arc of at least ninety degrees; a traverse guide supporting said book cradle, said traverse guide capable of being raised and lowered; at least one horizontal glass plate which can be slid into said work space, wherein a top surface of one of said support walls of said book cradle can be pressed against the bottom surface of said horizontal glass plate; and a book support for a book to be photographed, said book support comprising a cover plate for engaging each said support walls and a modifiable spine plate connected to said cover plates by hinge joints.

15. A device as claimed in claim 14, wherein a toothed rack member is mounted on each of said cover plate where it can be slidable in a slot or groove of the engaged said support wall, said toothed rack member mating in said slot or groove with a cog wheel, said cog wheel capable being rotated by means of a crank.

16. A device for photographing bound volumes comprising: a book cradle having two support walls standing perpendicular to one another for supporting a book cover and delimiting a work space on two sides, said book cradle being capable of being tilted through an arc of at least ninety degrees; a traverse guide supporting said book cradle, said traverse guide capable of being raised and lowered by a tension wedge means, drive means for moving said tension wedge means horizontally, and at least one wheel mounted on said traverse guide, so that said wheel rolls on the upper surface of said tension wedge means; and at least one horizontal glass plate which can be slid into said work space wherein a top surface of one of said support walls of said book cradle can be pressed against the bottom surface of said horizontal glass plate.

17. A device as claimed in claim 16, wherein said drive means for said tension wedge means comprises a tension cable line.

18. A device for photographing bound volumes comprising: a book cradle having two support walls standing perpendicular to one another for supporting a book cover and delimiting a work space on two sides, said book cradle being capable of being tilted through an arc of at least ninety degrees; a traverse guide supporting said book cradle, said traverse guide capable of being raised and lowered; at least one horizontal glass plate which can be slid into said work space, wherein the top surface of one of said support walls of said book cradle can be pressed against the bottom surface of said horizontal glass plate; and a holding blade arranged to stand substantially perpendicular to said glass plate, said holding blade mounted on the inside edge of said glass plate.

* * * * *